Feb. 27, 1945.  J. JOSS  2,370,470
GLASS CUTTING APPARATUS
Filed Jan. 8, 1943   2 Sheets-Sheet 1

Inventor
Joseph Joss
By Clarence A. O'Brien
and Harvey B. Jacobson
Attorneys

Feb. 27, 1945. J. JOSS 2,370,470
GLASS CUTTING APPARATUS
Filed Jan. 8, 1943 2 Sheets-Sheet 2
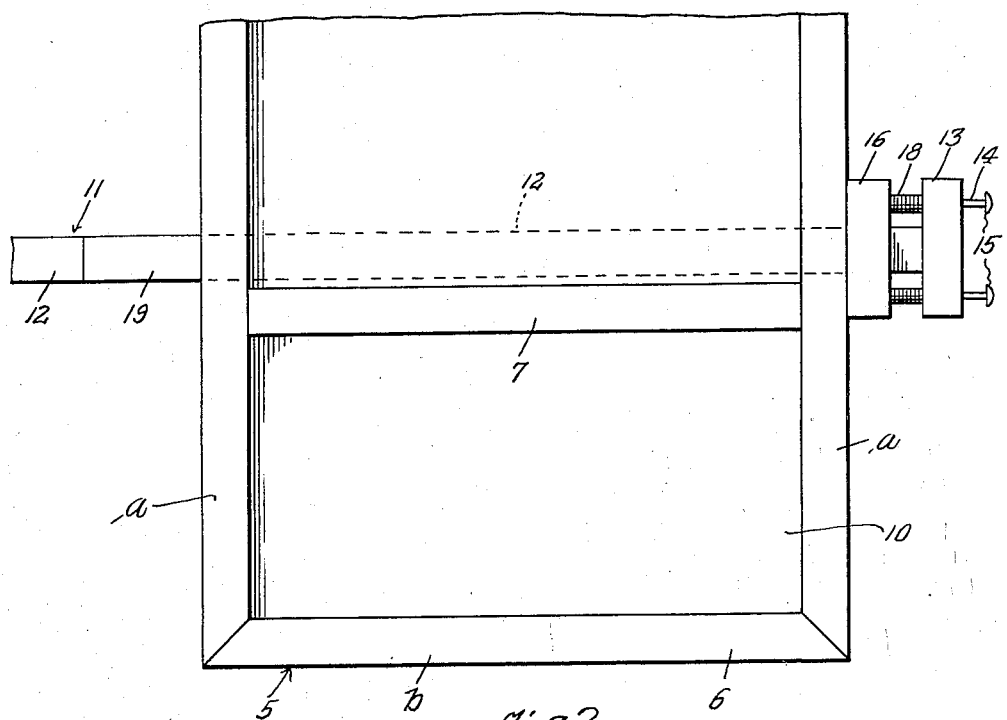
Fig. 2.
Fig. 3.
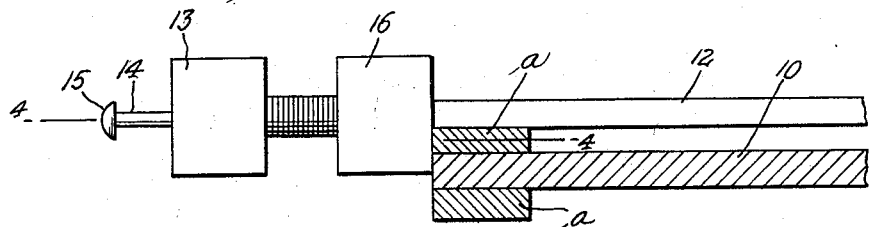
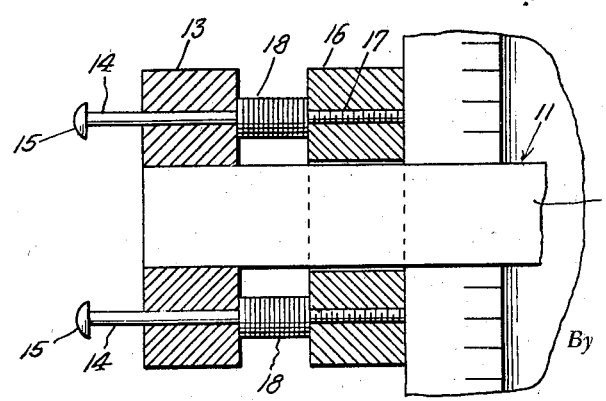
Fig. 4.
Inventor
Joseph Joss
By Clarence A. O'Brien
and Harvey B. Jacobson
Attorneys Patented Feb. 27, 1945

2,370,470

UNITED STATES PATENT OFFICE 2,370,470

GLASS CUTTING APPARATUS

Joseph Joss, Douglas, Ariz.

Application January 8, 1943, Serial No. 471,719

1 Claim. (Cl. 33—76)

This invention relates to new and useful improvements in glass cutting devices and more particularly to means whereby glass can be cut crosswise and lengthwise conveniently and accurately.

An important object of the invention is to provide a simplified glass cutting board and straight edge which can be manufactured and retailed at a low price.

Other objects and advantages of the invention will become apparent to the reader of the following description.

In the drawings:

Figure 2 is a fragmentary bottom plan view of the board and straight edge.

Figure 3 is a section on the line 3—3 of Figure 1.

Figure 4 is a section on the line 4—4 of Figure 3.

Figure 5 is a fragmentary side elevational view of the straight edge.

Figure 1:
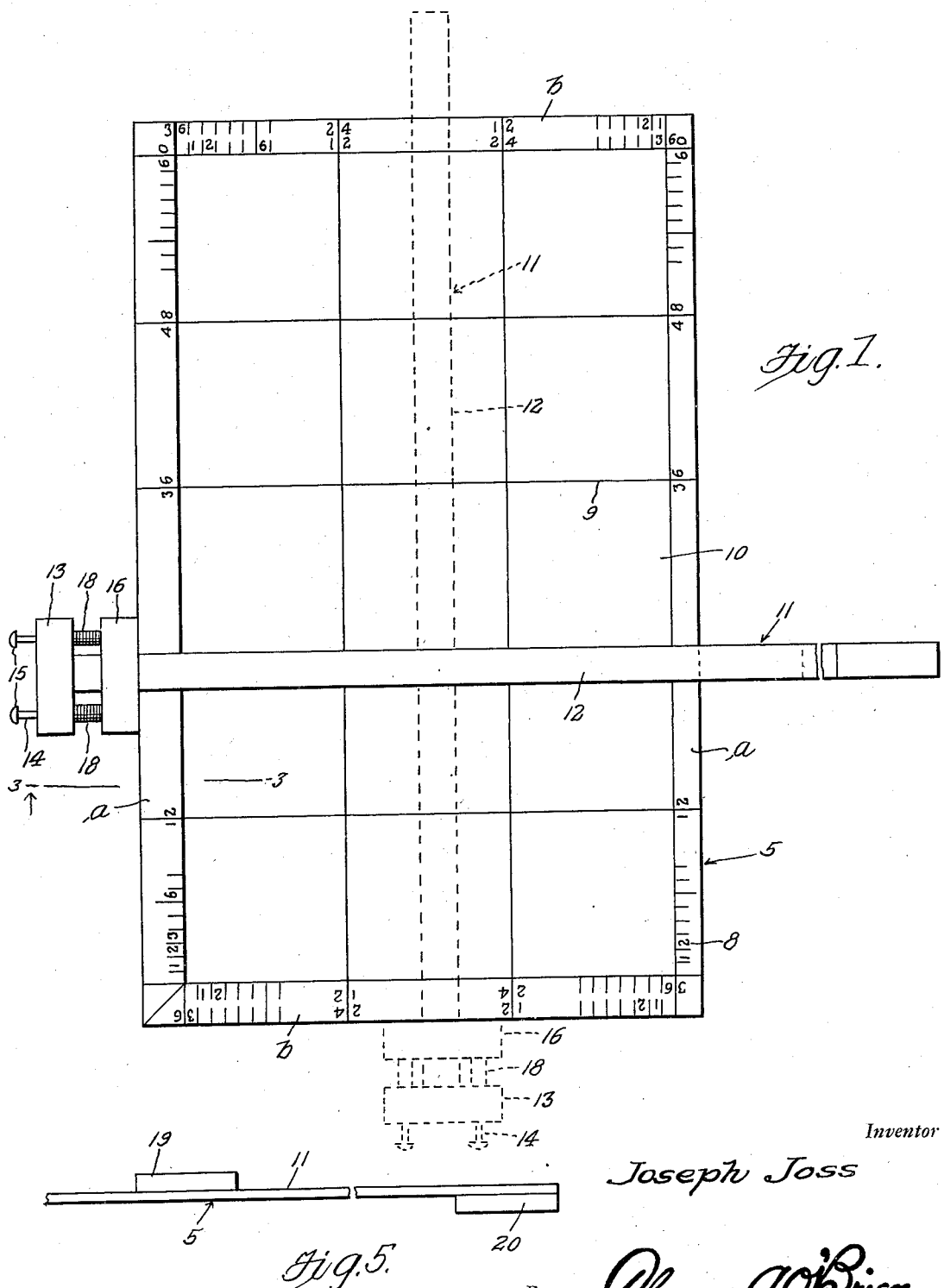
Figure 1 represents a top plan view showing the board with the straight edge disposed crosswise, the straight edge being shown in broken lines disposed lengthwise of the board.

Referring to the drawings wherein like numerals designate like parts, it can be seen that numeral 5 denotes a board made up of a rectangular-shaped frame 6 consisting of side members $a$, $a$ and end members $b$, $b$. Suitable brace or jaw members 7 may be employed in the frame to reinforce the same.

Suitable graduations 8 are provided on all of the frame members at the top surface thereof and suitable guide markings 9 are disposed transversely and longitudinally on a top 10 which fills the frame 5, this top 10 having its top surface below the top surfaces of certain frame members.

Numeral 11 generally refers to a straight edge, the same comprising an elongated bar 12 provided at one end with a rectangular-shaped block 13 the end portions of which project laterally beyond opposite sides of the bar 12. The block 13 has openings in the end portions thereof to receive guide rods 14, 14 each of which is headed as at 15.

Slidably disposed on the bar 12 adjacent the block 13 is a block 16 and the rods 14 have threaded end portions 17 for disposition into the end portions of the slide block 16. Coiled compression springs 18, 18 are interposed between corresponding end portions of the blocks 13, 16.

The remaining end of the bar 12 has a cleat 19 at its top side, somewhat inwardly from the adjacent end thereof for the purpose of engaging one side of the frame 5 when the straight edge 11 is being employed in a transverse position.

A second cleat 20 is secured to the underside of the bar 11 at the extremity thereof and as shown in Figure 5, and this is to abut the end portions $b$ of the frame 5 when the straight edge is employed in a longitudinal position.

In the use of the device, it can be seen that the block 16 is placed against, say one side portion $a$ of the frame and a pull exerted longitudinally on the bar 12 so as to compress the springs 18 whereupon the bar is lowered so that the corresponding cleat 19 can engage and abut the opposite side portion of the frame. This is, of course, after proper placement of the bar 12 has taken place in order that the proper size piece of glass can be cut.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

In glass cutting apparatus, a board having side edges, a straight edge adapted to extend across the board and having an abutment thereon adjacent one end for engagement with one side edge of said board, and detent means on the other end of said straight edge for clampingly engaging the other side edge of said board comprising a pair of elongated, like blocks extending crosswise of said straight edge and one fixed on said other end of the straight edge and forming a T-head thereon, the other block having said straight edge slidably extended through the center thereof and being substantially thicker than the straight edge for engagement with said other side edge of the board when either face of the straight edge is opposed to said board, a pair of headed pins slidably extended through the first-mentioned block alongside opposite side edges of the straight edge and having ends fixed in the second-mentioned block, and coil springs circumposed on said pins intermediate said blocks.

JOSEPH JOSS.